(12) United States Patent
Fidelfatti et al.

(10) Patent No.: US 11,009,086 B2
(45) Date of Patent: May 18, 2021

(54) FREE WHEEL ASSEMBLY WITH FRONT CLUTCHES FOR A BICYCLE

(71) Applicant: CAMPAGNOLO S.r.l., Vicenza (IT)

(72) Inventors: Enrico Fidelfatti, Camisano Vicentino (IT); Keith Joseph Wakeham, Calgary (CA)

(73) Assignee: Campagnolo S.r.l., Vicenza (IT)

( * ) Notice: Subject to any disclaimer, the term of this patent is extended or adjusted under 35 U.S.C. 154(b) by 34 days.

(21) Appl. No.: 16/459,697

(22) Filed: Jul. 2, 2019

(65) Prior Publication Data

US 2020/0011385 A1 Jan. 9, 2020

(30) Foreign Application Priority Data

Jul. 5, 2018 (IT) .................. 102018000006956

(51) Int. Cl.
*F16D 41/36* (2006.01)
*F16D 41/24* (2006.01)
*F16D 121/18* (2012.01)

(52) U.S. Cl.
CPC .............. *F16D 41/36* (2013.01); *F16D 41/24* (2013.01); *F16D 2121/18* (2013.01)

(58) Field of Classification Search
CPC ........ F16D 41/36; F16D 41/22; B60B 27/023
See application file for complete search history.

(56) References Cited

U.S. PATENT DOCUMENTS 6,123,179 A 9/2000 Chen
7,562,755 B2 * 7/2009 Spahr ................ B60B 27/0073
192/30 V
9,199,509 B2 * 12/2015 Koshiyama ........... B60B 27/023
9,649,880 B2 * 5/2017 Fujita .................... B60B 27/023
9,707,801 B2 * 7/2017 Fujita ....................... F16D 1/10
10,286,726 B2 * 5/2019 Spahr .................. B60B 27/0047

(Continued)

FOREIGN PATENT DOCUMENTS

EP 2 221 191 A1 8/2010
EP 2 529 949 A1 12/2012
TW 201 315 619 A 4/2013

OTHER PUBLICATIONS

Italian Search Report and Written Opinion in Italian Application No. 102018000006956, dated Mar. 27, 2019, with English translation.

*Primary Examiner* — David R Morris
(74) *Attorney, Agent, or Firm* — Volpe Koenig (57) ABSTRACT

A free wheel assembly with front clutches comprising a hub sleeve rotatable on a hub pin and a cassette rotatable on the hub pin, a first annular body rotatable on the hub pin and comprising a first crown gear, a second annular body associated with the hub sleeve and comprising a matching second crown gear facing the first crown gear. The first annular body is axially movable relative to the second annular body between a motion transmission configuration and a free wheel configuration and coupling members operate between the first annular body and the cassette. In the free wheel configuration, rotation of the cassette relative to the first annular body forces the coupling members to axially translate the first annular body towards the second annular body, and magnetic members active on the first annular body and opposing the rotation of the first annular body with respect to the hub pin.

15 Claims, 8 Drawing Sheets

(56) References Cited

U.S. PATENT DOCUMENTS

| | | | |
|---|---|---|---|
| 10,293,639 B2 * | 5/2019 | Fujita | F16D 1/10 |
| 10,406,855 B2 * | 9/2019 | Fujita | F16H 1/00 |
| 10,421,316 B2 * | 9/2019 | Braedt | F16D 41/36 |
| 10,723,174 B2 * | 7/2020 | Meggiolan | B60B 27/023 |
| 2008/0006500 A1 | 1/2008 | Spahr | |
| 2009/0255774 A1 | 10/2009 | Hsu | |
| 2014/0062164 A1 | 3/2014 | Spahr et al. | |
| 2015/0202919 A1 * | 7/2015 | Koshiyama | B60B 27/047 |
| | | | 192/64 |
| 2016/0223033 A1 * | 8/2016 | Fujita | F16D 41/36 |
| 2017/0015137 A1 | 1/2017 | Braedt et al. | |
| 2017/0096029 A1 * | 4/2017 | Fujita | F16D 1/10 |
| 2017/0232791 A1 * | 8/2017 | Fujita | B60B 27/047 |
| | | | 192/64 |
| 2018/0345723 A1 * | 12/2018 | Fujita | B60B 27/0026 |
| 2019/0135036 A1 * | 5/2019 | Meggiolan | B60B 27/023 |

* cited by examiner

FREE WHEEL ASSEMBLY WITH FRONT CLUTCHES FOR A BICYCLE

CROSS REFERENCE TO RELATED APPLICATION

This application claims the benefit of Italian Application No. 102018000006956, filed on Jul. 5, 2018, which is incorporated herein by reference as if fully set forth.

FIELD OF INVENTION

The present invention relates to a free wheel with front clutches for a bicycle.

BACKGROUND

The motion transmission system of a bicycle comprises a pair of pedal cranks, on which the cyclist exerts a propulsive thrust, one or more driving toothed wheels, set in rotation by direct coupling with the pedal cranks, and a plurality of driven toothed wheels, also called sprockets, of different dimensions, set in rotation by the driving toothed wheels through a transmission chain.

The sprockets are coupled with the rear wheel of the bicycle through a cassette which is rotatably coupled with a hub sleeve. The hub sleeve rotates as a unit with the rim of the bicycle through spokes, and is rotatably fitted onto a hub pin fixed with respect to the frame of the bicycle. The cassette (and therefore the sprockets) is coupled with the hub sleeve through a mechanism called "free wheel" in the technical jargon.

The free wheel allows transmitting the rotation of the sprockets to the rear wheel when the rotation speed of the sprockets is equal to the rotation speed of the rear wheel and allows decoupling the movement between the sprockets and the rear wheel when the rotation speed of the sprockets is different from that of the wheel.

The free wheel thus allows the movement as a unit among sprockets (and cassette) and rear wheel only when the sprockets are set in rotation in the direction of rotation of the rear wheel and at the same speed as the wheel, whereas in the opposite direction or for lower rotation speeds than those of the wheel it does not produce any effect on the rear wheel that continues in its rotation by inertia and does not force the cyclist to keep the legs moving to assist the rotation of the rear wheel.

One type of free wheel provides for an annular body rotating as a unit with the cassette (and thus with the sprockets) and an annular body rotating as a unit with the rear wheel (and thus with the hub sleeve). The two annular bodies rotate around a same rotation axis substantially coinciding with the rotation axis of the hub sleeve of the rear wheel.

In the free wheels with front clutches, the two annular bodies have respective mutually facing axial toothings. Such toothings are shaped so that, when in axial engagement with each other, they transmit a drive torque from the annular body constrained to the cassette to the annular body constrained to the rear wheel when the sprockets rotate in a first angular direction, thus transmitting the rotation of the sprockets to the rear wheel when the cyclist exerts a propulsive action on the pedals. The axial toothings do not transmit any drive torque between the two annular bodies when the rotation speed of the sprockets in the first angular direction is less than the angular speed of the rear wheel or when the sprockets rotate in a second angular direction, thus allowing the free rotation of the rear wheel when the cyclist stops his/her propulsive action on the pedals or when he/she actuates the pedals in the opposite direction to that of propulsion.

Usually, the axial toothings are shaped according to a circumferential path comprising a sequence of inclined planes separated by substantially axial planes, to form a substantially "sawtooth wave" geometry. During rotations in the first angular direction, the axial planes of the annular body fixedly connected to the sprockets are in abutment against the axial planes of the annular body fixedly connected to the rear wheel, transmitting to the rear wheel the motion of the sprockets. During rotations in the second angular direction of the sprockets or when the speed of rotation in the first angular direction of the sprockets is less than the angular speed of the rear wheel, the inclined planes of the annular body fixedly connected to the sprockets slide over the inclined planes of the annular body fixedly connected to the rear wheel, interrupting the transmission of motion between sprockets and rear wheel.

Following the sliding between the inclined planes, the two annular bodies move apart axially and the axial toothings lose contact with each other.

In order to recouple the axial toothings with each other (condition necessary to transmit the motion from the sprockets to the rear wheel), the free wheel usually comprises elastic or magnetic elements arranged in the radial space occupied by one of the annular bodies and that exert a constant or intermittent axial thrusting action on one of the annular bodies towards the other annular body.

Such an axial thrusting action allows recoupling the annular bodies when the cyclist restarts the propulsive action.

Examples of magnetic return members are described in documents US 2014/0062164 and US 2017/0015137.

SUMMARY

The Applicant has noted that the use of the free wheels described above results in a dissipation of kinetic energy of the rear wheel that can even be of the order of about 2 Watt at speeds of about 50 Km/h when the cyclist stops applying propulsive action.

Such a dissipation of kinetic energy has a negative impact on the performance of the cyclist, forcing him/her to make greater effort to compensate for the kinetic energy dissipated.

The Applicant has verified that such dissipation of kinetic energy can result from the substantially continuous and constant slipping of the inclined planes of the axial toothings of an annular body on the inclined planes of the axial toothings of the other annular body when the cyclist has stopped his propulsive action.

The Applicant deems that such slipping between the axial toothings results from the axial thrusting action exerted by the elastic or magnetic elements on one annular body towards the other annular body.

The Applicant has indeed verified that such axial thrusting action triggers a repetitive process (which only stops when the cyclist starts applying propulsive action again) during which every axial movement apart of the two annular bodies is followed by an immediate coming back together thereof during which the inclined planes of the two annular bodies slide over one another dissipating energy.

The present invention relates to a free wheel assembly with front clutches for a bicycle comprising:

a hub sleeve rotatably mounted on a hub pin about a rotation axis and a cassette rotatably mounted on the hub pin;

a first annular body, rotatable about the rotation axis along a first angular direction and a second angular direction, rotatably inserted on the hub pin, and comprising a first crown gear;

a second annular body coupled in rotation with said hub sleeve and comprising a second crown gear matching and axially facing said first crown gear;

said first annular body being axially movable with respect to the second annular body between a motion transmission configuration, in which the first crown gear is coupled with the second crown gear, and a free wheel configuration, in which the first crown gear is separated from the second crown gear and the first annular body does not transfer motion to the second annular body;

coupling members operating between the first annular body and the cassette;

wherein, when the first annular body is the free wheel configuration, a rotation of the cassette with respect to the first annular body forces said coupling members to axially translate the first annular body towards the second annular body, and wherein magnetic members are configured to oppose the rotation of the first annular body with respect to the hub pin.

BRIEF DESCRIPTION OF THE DRAWINGS

Further features and advantages of the invention will become clearer from the following description of preferred embodiments thereof, made with reference to the attached drawings. In such drawings.

DETAILED DESCRIPTION OF THE PREFERRED EMBODIMENTS

The present invention therefore relates to a free wheel assembly with front clutches for a bicycle comprising:

a hub sleeve rotatably mounted on a hub pin about a rotation axis and a cassette rotatably mounted on the hub pin;

a first annular body, rotatable about the rotation axis along a first angular direction and a second angular direction, rotatably inserted on the hub pin, and comprising a first crown gear;

a second annular body coupled in rotation with said hub sleeve and comprising a second crown gear matching and axially facing said first crown gear;

said first annular body being axially movable with respect to the second annular body between a motion transmission configuration, in which the first crown gear is coupled with the second crown gear, and a free wheel configuration, in which the first crown gear is separated from the second crown gear and the first annular body does not transfer motion to the second annular body;

coupling members operating between the first annular body and the cassette;

wherein, when the first annular body is the free wheel configuration, a rotation of the cassette with respect to the first annular body forces said coupling members to axially translate the first annular body towards the second annular body, and wherein magnetic members are configured to oppose the rotation of the first annular body with respect to the hub pin.

When the first annular body is in the motion transmission configuration and the cyclist exerts a propulsive action, the rotation applied to the cassette is transmitted to the first annular body that sets in rotation the second annular body, and therefore the hub sleeve, along the first angular direction.

When the cyclist interrupts the propulsive action, the second annular body pushes the first annular body (by means of the interference between the crown gears of the two annular bodies) in an axially outer direction decoupling the cassette from the second annular body (and thus from the hub sleeve). The first annular body thus reaches a free wheel configuration.

The Applicant has perceived that by arranging coupling members that axially translate the first annular body towards the second annular body in the case in which there is a rotation of the cassette with respect to the first annular body, the first annular body remains stably in the free wheel configuration (and does not tend to go back into the motion transmission configuration) until the moment when such relative rotation takes place.

The Applicant has found that by arranging magnetic members that oppose the rotation of the first annular body with respect to the hub pin, the first annular body moves axially towards the second annular body (and thus towards the motion transmission configuration) only when the cyclist starts the propulsive action again.

Indeed, when the first annular body is in the free wheel configuration since the cyclist has stopped pedaling, the cassette is stationary and the first annular body is also stationary. Therefore, the relative speed of the cassette with respect to the first annular body is zero.

When the cyclist starts the propulsive action again, the cassette rotates with respect to the hub pin. The first annular body would tend to be dragged in rotation by the cassette but is braked by means of the magnetic members that oppose a rotation of the first annular body with respect to the hub pin. The final effect is that the cassette rotates with respect to the first annular body.

In this way, the first annular body translates axially towards the second annular body when a propulsive action is started again on the pedals of the bicycle.

This avoids continuous or intermittent contact of the first annular body against the second annular body when no propulsive action is applied to the pedals of the bicycle and prevents the first annular body from engaging the second annular body when the propulsive action starts again.

The components of the free wheel assembly are configured to rotate about a rotation axis coinciding with the rotation axis of the rear wheel of the bicycle. Such a rotation axis is the main reference axis for the elements that form part of the present invention; all of the indications of direction and similar, such as "axial", "radial", "circumferential" and "diametral" will be made with respect to it. The indications "outwards", "outside" and "inwards" and "inside" referring to radial directions should be interpreted, respectively, as away from the rotation axis or towards the rotation axis. The indications "outwards", "outside" and "inwards" and "inside" referring to axial directions should be interpreted, respectively, as away from a radial middle plane from the wheel of the bicycle or towards such a radial plane (when the wheel is in use). With respect to the rotation axis two opposite directions of rotation are defined, in particular a first angular direction (which preferably coincides with the angular direction of rotation of the rear wheel that allows the bicycle to move forwards) and a second angular direction.

The present invention can comprise one or more of the following preferred features, taken singularly or in combination.

Preferably, said magnetic members are active between the hub pin and the first annular body.

In this way, the magnetic members exert their action directly between the hub pin and the first annular body.

Preferably, the magnetic members are "contactless", namely they exert their action between the hub pin and the first annular body without any physical contact between these two elements or without any element or any auxiliary body directly in contact with the hub pin and the first annular body.

Preferably, the magnetic members are configured to exert a resistant torque that opposes the rotation of the first annular body with respect to the hub pin. Preferably, such a resistant torque is smaller than a predetermined drive torque adapted for rotating the first annular body with respect to the hub pin.

The torque exerted by the magnetic members is a braking torque. In other words, the magnitude of the torque exerted by the magnetic members is less than the drive torque that the cyclist usually transmits to the cassette during a propulsive action.

In other words, when the drive torque exerted by the cyclist on the pedals and transmitted to the cassette is less than a predetermined threshold, the magnetic members prevent the first annular body from rotating with respect to the hub pin. When the drive torque exerted by the cyclist is above such a predetermined threshold, the first annular body rotates with respect to the hub pin since the magnetic members are not capable of opposing such a rotation.

Such a predetermined threshold is substantially constant (it does not substantially change during the use of the bicycle) and is configured as a function of the type of bicycle, the use that must be made of it and possible further factors or parameters.

In any case, such a predetermined threshold is selected to not affect the performance of the cyclist, namely to avoid the braking action of the magnetic members being perceptible (or the least perceptible possible) to the cyclist.

As an example, such a predetermined threshold can have a value comprised between 1 N/m and 50 N/m, preferably comprised between 5 N/m and 35 N/m, more preferably comprised between 10 N/m and 25 N/m, more preferably about 20 N/m.

Without being limited to specific examples, it has been estimated that during a climb a cyclist is capable of exerting a drive torque of up to 600 N/m; it has been estimated that a resistant torque offered by the magnetic members of about 20 N/m is not practically perceived by the cyclist during a climb. Such a value is moreover very little perceived also during a propulsive action on flat terrain.

Preferably, the first annular body has a predetermined axial dimension; said magnetic members being active on a portion of the first annular body having an axial extension of at least 25% of said predetermined axial dimension when the first annular body is in the free wheel configuration.

In other words, preferably the magnetic members are capable of exerting the cited torque on the first annular body for at least an initial part of the axial movement that moves the first annular body from the free wheel configuration to the motion transmission configuration.

Preferably, the coupling members comprise a plurality of guides having spiral or helix shaped extension operating between the first annular body and the cassette.

In this way, the first annular body moves axially with respect to the cassette during a relative rotation between the cassette and the first annular body.

Without being constrained to any theory, the Applicant has perceived that the spiral-shaped extension of the coupling members triggers the movement of the first annular body towards the second annular body when the cyclist starts the propulsive action again. When the cyclist starts the propulsive action again, the cassette is set in rotation at the same angular speed as the rear wheel. Due to the torque (in this case a braking torque) exerted by the magnetic members, the first annular body does not rotate as a unit with the cassette but follows the spiral or helix-shaped trajectory given by the coupling members. Such a trajectory has a circumferential component and an axial component. The axial component determines the translation of the first annular body towards the second annular body that continues until the cyclist exerts his/her propulsive action and until the first annular body contacts the second annular body (motion transmission configuration).

The contact between the crown gears of the two annular bodies creates a further constraint for the movement of the first annular body and in particular prevents the first annular body from translating further in the axially inner direction. The first annular body thus rotates as a unit with the cassette.

Preferably, the extension in the axial direction of said spiral-shaped guides is greater than or equal to the axial distance between the first crown gear and the second crown gear when the first annular body is in the free wheel configuration.

In this way, the first annular body can translate axially guided by the coupling members along the entire maximum distance that separates the first annular body from the second annular body.

Preferably, the free wheel assembly comprises a holding magnet axially operative on the first annular body to hold the first annular body in the free wheel position.

The holding magnet prevents the first annular body from accidentally translate towards the second annular body, for example due to vibrations or impacts to which the wheel of the bicycle is subjected during use.

The magnetic force of the holding magnet is selected to allow the movement of the first annular body towards the second annular body when the cyclist starts the propulsive action again.

Preferably, said magnetic members comprise at least one portion made of ferromagnetic material of said first annular body and at least one permanent magnet.

In a first preferred embodiment of the invention, the first annular body is made at least partially of ferromagnetic material.

Preferably, the portion made of ferromagnetic material of the first annular body is made at least partially of steel alloys, or of iron-nickel-aluminum alloys or of iron-silicon alloys or of iron-nickel alloys or a combination thereof.

Preferably, the magnetic members further comprise a magnetized body fixedly connected to the hub pin, radially facing a radially inner portion of the first annular body and axially facing an axially outer portion of the first annular body so making a magnetic circuit that crosses said first annular body.

The magnetic circuit crosses the magnetized body and closes in the first annular body.

Preferably, said magnetized body comprises a plurality of projections radially directed towards the first annular body and in which the first annular body comprises a plurality of projections radially directed towards the magnetized body; the radial distance between said projections of the first annular body and of the magnetized body defining gaps (or airgaps) in said magnetic circuit.

The gaps separate the first annular body from the magnetized body, so that the first annular body can rotate and translate with respect to the magnetized body.

Preferably, the projections of the first plurality of projections of the first annular body have an identical radial and circumferential extension and are circumferentially separated from one another by identical distances and the projections of the first plurality of projections of the magnetized body have an identical radial and circumferential extension and are circumferentially separated from one another by identical distances.

As a function of the angular position of the first annular body with respect to the magnetized body, the gaps (or airgaps) have different heights (in the radial direction). The alternation in circumferential direction of the projections (and thus of the gaps) creates a sort of cogging torque, and in particular a cogging torque at every gap of minimum height, between the first annular body and the magnetized body. Such a cogging torque realizes the cited torque that opposes the rotation of the first magnetic body with respect to the hub pin.

Preferably, the permanent magnet magnetizes said magnetized element.

The choice of the type and intensity of the permanent magnet is a function of the distance between the projections of the first annular body and of the magnetized body and of the intensity of the desired cogging torque.

Preferably, said holding magnet coincides with said permanent magnet of the magnetic members.

In a further preferred embodiment of the invention, said magnetic members comprise first magnets fixedly connected to the hub pin and at least one second magnet rotating as a unit with the first annular body and magnetically interacting with said first magnets.

The interaction between the first magnets and the at least one second magnet makes the cited torque that opposes the rotation of the first annular body with respect to the hub pin.

Preferably, the first magnets and said at least one second magnet have a radially directed polarization. In other words, the magnetic poles of the first and second magnets are aligned along a radial direction.

Preferably, the first magnets follow one another and are spaced apart from one another in the circumferential direction; the polarities of two circumferentially adjacent first magnets being opposite. In other words, two circumferentially adjacent first magnets have opposite magnetic poles in radially inner direction and thus in radially outer direction. Two radially adjacent first magnets thus have respective magnetic fields with magnetic field lines radially entering and radially exiting the magnet.

In this way, when the first annular body rotates with respect to the hub pin, the second magnet enters into the magnetic field of a first magnet, being attracted by this and tending to oppose a further rotation of the first annular body (realizing the cited torque that opposes the rotation of the first annular body with respect to the hub pin). When the first annular body rotates further, the second magnet enters into the magnetic field of an adjacent first magnet being repelled by it in the direction of a further circumferentially adjacent first magnet that has a magnetic field that attracts the second magnet again.

The choice of the type and intensity of the first and second magnets and the circumferential distance between two circumferentially consecutive first magnets is a function of the intensity of the torque that opposes the rotation of the first annular body that it is wished to obtain.

Preferably, the distance between two circumferentially consecutive first magnets is comprised between about 0.1 and 4 times the circumferential extension of a first magnet.

Preferably, a plurality of second magnets is provided having identical polarity and preferably identical to one another. The second magnets are preferably equally spaced apart from one another in the circumferential direction and the distance that separates a second magnet from a circumferentially consecutive second magnet is an integer multiple of the distance that separates two circumferentially adjacent first magnets.

With reference to the drawings, a free wheel assembly with front clutches in accordance with the present invention is wholly indicated with 10.

The free wheel assembly 10 comprises a hub sleeve 11 rotating as a unit with the rear wheel of a bicycle through one or more spoke-holding flanges 12 constrained or integral with the hub sleeve 11.

The hub sleeve 11 is rotatably mounted about a hub pin 13, for example through rolling bearings 14, so as to rotate along a first angular direction A and a second angular direction B opposite the first A. The first angular direction A coincides with the direction of rotation of the rear wheel of the bicycle while the bicycle moves forwards.

The hub pin 13 is preferably crossed by a hub pin (not illustrated) that fixedly connects the hub pin 13 to a frame of the bicycle. The hub sleeve 11 is thus rotatable about a rotation axis X coinciding with a rotation axis of the rear wheel of the bicycle.

The free wheel assembly 10 comprises a first annular body 15 and a second annular body 16 arranged and active always in axially inner position with respect to the first annular body 15.

Figure 8:
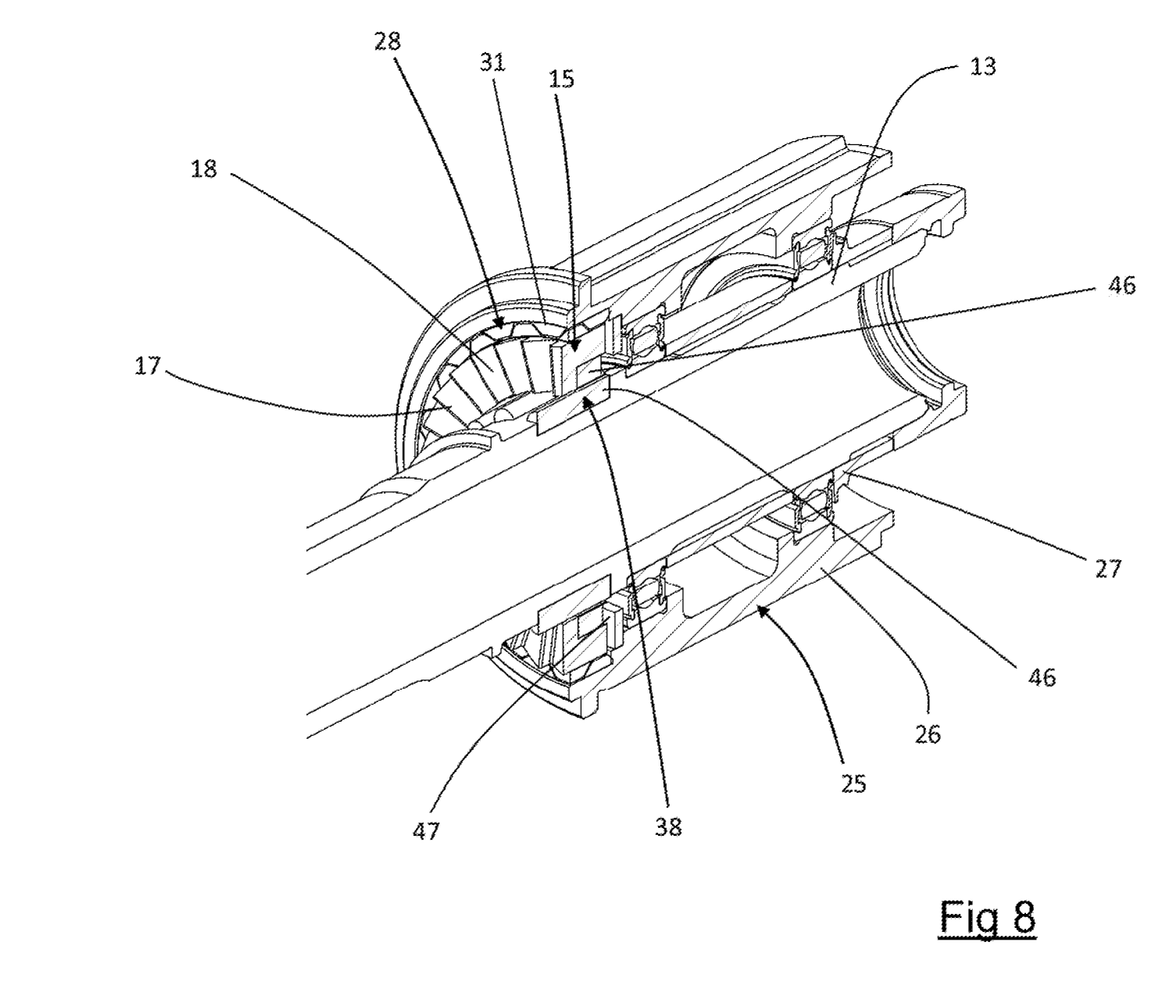
FIG. 8 is a perspective section view of a further portion of the free wheel assembly of FIG. 6.

The first annular body 15 is rotatably mounted on the hub pin 13 and comprises a first crown gear 17 (illustrated in FIGS. 2 and 8) having teeth 18 directed in the axially inner direction towards the second annular body 16.

The teeth 18 have a "sawtooth wave" profile, namely they comprise a succession of first portions that are substantially flat and inclined with respect to the axial direction interspaced with second portions that are substantially flat lying in planes parallel to the rotation axis X.

The second annular body 16 is configured to rotate as a unit with the rear wheel of the bicycle and is constrained in rotation to the hub sleeve 11.

The second annular body 16 is axially more inner than the first annular body 15 and is axially aligned with the latter.

Figure 1:
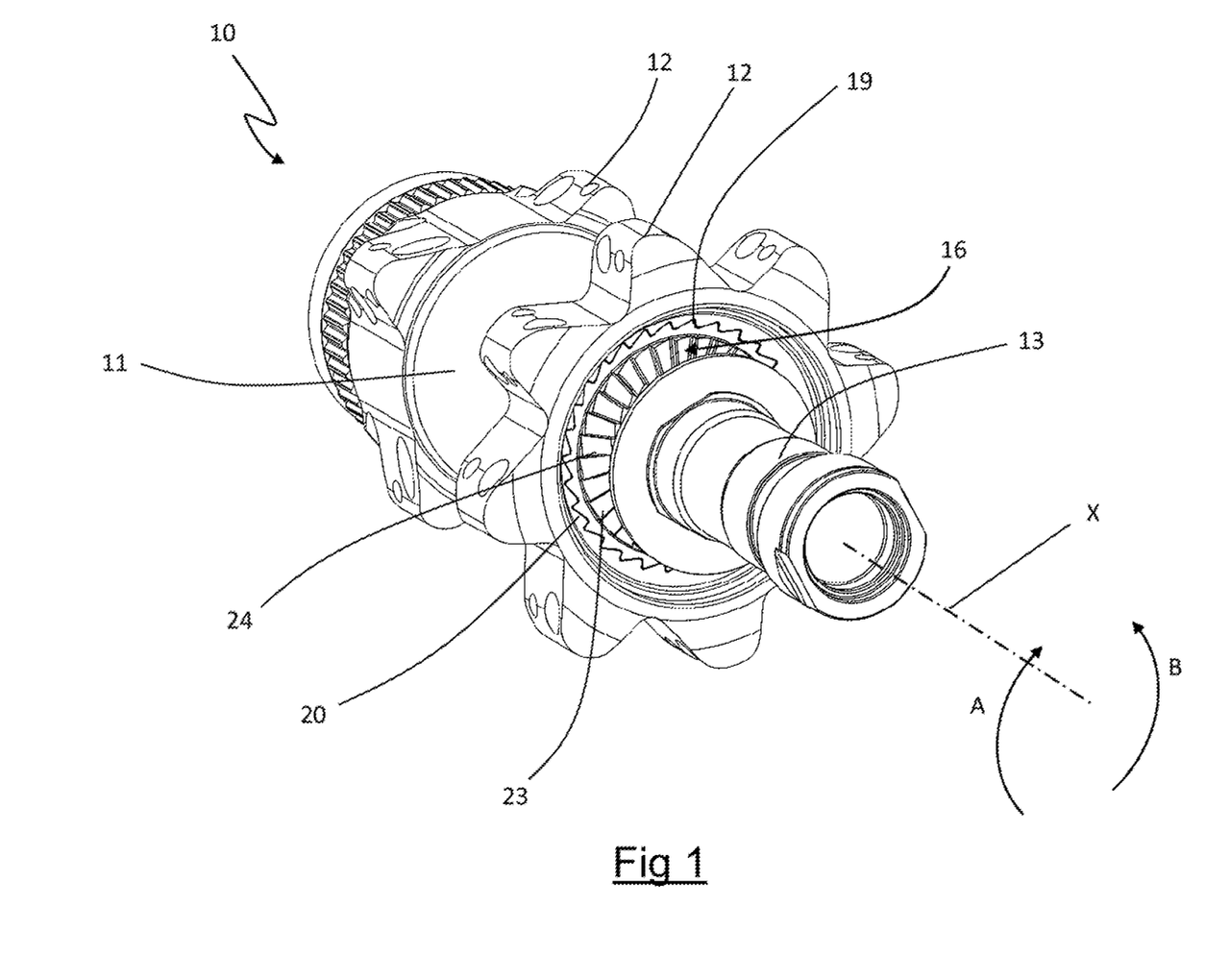
FIG. 1 is a perspective view of a first portion of the free wheel assembly in accordance with the present invention.

In the preferred embodiments of the invention, the second annular body 16 is inserted in a circumferential recess 19 of the spoke-holding flange 12 to rotate as a unit with the latter, as illustrated in FIG. 1.

Concerning this, the circumferential recess 19 of the spoke-holding flange 12 comprises a radially inner toothing 20 (better illustrated in FIG. 3) that defines a rack and the second annular body 16 is equipped with a radially outer surface 21 having a toothing 22 (illustrated in FIG. 7) counter-shaped to the toothing 20 of the spoke-holding flange 12.

The coupling between the toothings 20, 22 of the spoke-holding flange 12 and of the second annular body 16 prevent relative rotations of the second annular body 16 with respect to the spoke-holding flange 12 and to the hub sleeve 11.

The second annular body 16 further comprises a second crown gear 23 having teeth 24 directed axially towards the first annular body 15 and matching the teeth 18 of the first crown gear 17.

The teeth 24 have a "sawtooth wave" profile, namely they comprise a succession of first portions that are substantially flat and inclined with respect to the axial direction interspaced with second portions that are substantially flat lying in planes parallel to the rotation axis X.

The first annular body 15 is movable in the axial direction with respect to the second annular body 16 between a motion transmission configuration and a free wheel configuration.

In particular, when the first annular body is in the motion transmission configuration, the first annular body 15 transmits to the second annular body 16 a rotation along the first angular direction A, whereas in the free wheel condition the first annular body 15 does not transmit any rotation to the second annular body 16.

In other words, in the motion transmission configuration, the angular speed of the first annular body 15 in the first angular direction A is equal to the angular speed of the second annular body 16 in the first angular direction A.

Concerning this, the teeth 18 of the first annular body 15 and the teeth 24 of the second annular body 16 are configured so that when the first crown gear 17 is in contact with the second crown gear 23, the first annular body 15 is capable of transmitting a rotation along the first circumferential direction A to the second annular body 16 and is not capable of transmitting a rotation along the second circumferential direction B to the second annular body 16.

For relative rotations of the first annular body 15 with respect to the second annular body 16 in the second angular direction B, the respective first portions of the teeth 18, 24 slide over one another without the respective second portions being able to abut on one another, thus allowing a free rotation of the first annular body 15 with respect to the second annular body 16.

It should be noted that the sliding of the teeth 18 of the first annular body 15 on the teeth 24 of the second annular body 16 determines an axial sliding in the axially outer direction of the first annular body 15 with respect to the second annular body 16.

In the free wheel configuration, the axial position of the second annular body 16 is identical to the axial position that the second annular body 16 takes up in the motion transmission configuration.

In the free wheel configuration, the first annular body 15 reaches an outer axial position with respect to the axial position taken up by the first annular body 15 when in the motion transmission configuration.

The first annular body 15 is associated with a cassette 25, so that when the first annular body 15 is in the motion transmission configuration the rotation in the first angular direction A of the cassette 25 is transferred to the second annular body 16 and thus to the rear wheel of the bicycle.

The cassette 25 is configured to support a cogset (not illustrated) and to be set in rotation by the same.

The cassette 25 can be a substantially cylindrical body, equipped with a plurality of grooves directed axially on which the cogset is fitted and axially held by a ring nut, or it can be a small body to which a monolithic cogset is rigidly connected. In other embodiments, the cassette 25 can be integrated in the cogset, namely it can be in one piece with the cogset.

In any case, the cassette is set in rotation about the rotation axis X by the sprockets of the cogset, is rotatably mounted on the hub pin 13 and is axially constrained to the hub pin 13 without being able to translate with respect to the latter.

In the embodiment illustrated in the attached figures, the cassette 25 comprises a radially outer portion 26 and a radially inner portion 27. The radially inner portion 27 rotates as a unit with the hud pin 13 and the radially outer portion 26 is mounted on the radially inner portion 27 through rolling bearings 27a that allow the radially outer portion 26 to rotate about the rotation axis X with respect to the radially inner portion 27. The cogset is made to rotate as a unit with the radially outer portion 26 of the cassette 25.

Therefore, in the motion transmission configuration (illustrated in FIG. 6), the first annular body 15 makes it possible to transfer the rotary motion along the first angular direction A of the cogset to the second annular body 16.

In order to allow a translation in the axial direction of the first annular body 15 with respect to the second annular body 16, the free wheel assembly 10 comprises coupling members 28 operating between the first annular body 15 and the cassette 25.

Figure 3:
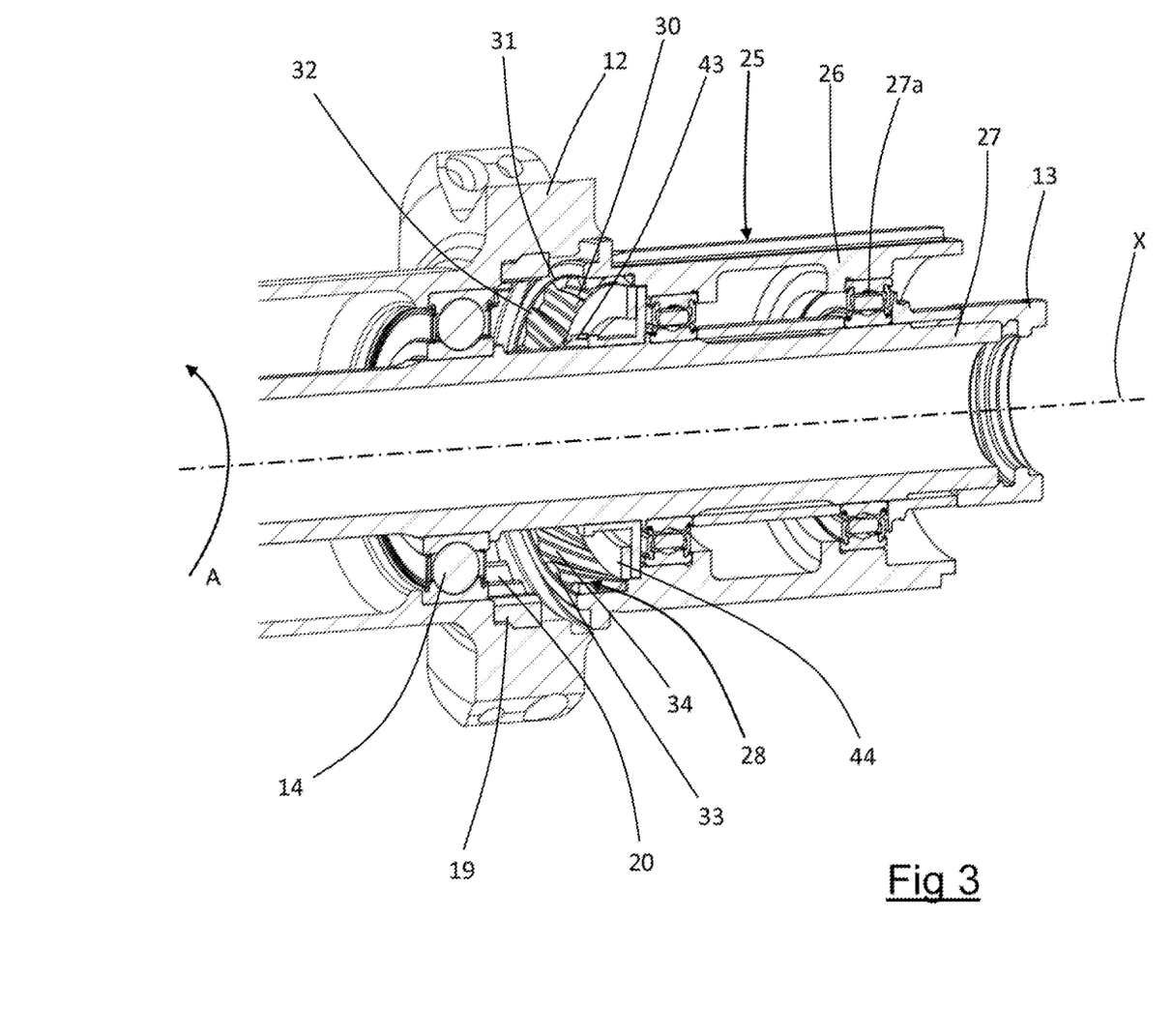
FIG. 3 is a perspective section view of the free wheel assembly in accordance with the present invention in the first embodiment with some parts removed to better highlight others.

The coupling members 28 comprise a first portion 29 arranged on a radially outer surface 30 of the first annular body 15 (FIG. 7) and a second portion 30 arranged on the radially inner surface 31 of the cassette 25 (FIG. 3).

The radially inner surface 31 of the cassette is formed in a substantially cylindrical circumferential recess 32 of the cassette 25 axially facing towards the first annular body 15.

The radially inner surface 31 of the cassette 25 comprises a first plurality of recesses 33 alternating with a first plurality of projections 34, as represented in FIG. 3.

The radially outer surface 30 of the first annular body 15 is annular and comprises a second plurality of projections 35 alternating with a second plurality of recesses 36 respectively matching the first plurality of recesses 33 and the first plurality of projections 34 of the radially inner surface 31 of the cassette 25.

The first plurality of projections 34 is inserted in the second plurality of recesses 36 and the second plurality of projections 35 is inserted in the first plurality of recesses 33.

The first 33 and second plurality of recesses 36 and the first 34 and second plurality of projections 35 have a substantially helical or spiral-shaped extension and form guides 37 (FIG. 2) having helical or spiral-shaped extension for the relative movement between the cassette 25 and the first annular body 15.

In this way, a relative rotation between the cassette 25 and the first annular body 15 also generates an axial translation of the first annular body 15.

In other words, the relative movement between the cassette 25 and the first annular body 15 is a roto-translation.

In particular, the guides 37 having helical extension are oriented so that a rotation of the cassette 25 in the first angular direction A with respect to the first annular body 15 corresponds to a translation of the first annular body 15 in the axially inner direction and a rotation of the cassette 25 in the second angular direction B with respect to the first annular body 15 corresponds to a translation of the first annular body 15 in the axially outer direction.

It should be noted that the translation of the first annular body 15 in the axially inner direction is interrupted when the teeth 18 of the first crown gear 17 engage the teeth 24 of the second crown gear 23 (motion transmission configuration), since the second annular body 16 and the cassette 25 are fixed, in other words they are not movable, in the axial direction.

Concerning this, in order to allow the coupling members 28 to axially guide the first annular body 15 until it makes contact with the second annular body 16 thus reaching the motion transmission condition, the extension in the axial direction of the guides 37 is greater than or equal to the distance in the axial direction that separates the position of the first annular body 15 when in the free wheel condition and the position of the first annular body 15 when in the motion transmission condition.

In the preferred embodiment of the invention, the extension in the axial direction of the second plurality of projections 35 and of the second plurality of recesses 36 formed on the radially outer surface 30 of the first annular body 15 is greater than or equal to the distance in the axial direction that separates the position of the first annular body 15 when in the free wheel condition and the position of the first annular body 15 when in the motion transmission condition. The extension in the axial direction of the second plurality of projections 35 and of the second plurality of recesses 36 formed on the radially outer surface 30 of the first annular body 15 is furthermore less than the extension in the axial direction of the first plurality of recesses 33 and of the first plurality of projections 34 formed on the radially inner surface 31 of the cassette 25.

In order to trigger a rotation of the cassette 25 with respect to the first annular body 15 along the first angular direction A, the free wheel assembly 10 comprises magnetic members 38 active on the first annular body 15 and configured to exert a torque on the first annular body 15 that opposes the rotation of the first annular body 15 with respect to the hub pin 13.

The magnetic members 38 act on the first annular body 15 so as to oppose the tendency of the cassette 25 to pull the first annular body 15 in rotation, namely so as to prevent the cassette 25 and the first annular body 15 from being able to rotate as a single body (when the first annular body 15 is in the free wheel configuration).

The magnetic members 38 are not capable of preventing the cassette 25 from being able to rotate around the rotation axis X with respect to the hub pin 13.

In particular, the magnetic members 38 exert a lower braking torque on the first annular body 15 than a predetermined drive torque exerted by the cyclist and adapted for rotating the first annular body 15 with respect to the hub pin 13. Such a predetermined drive torque can have a value comprised between 1 N/m and 50 N/m, preferably comprised between 5 N/m and 35 N/m, more preferably comprised between 10 N/m and 25 N/m, more preferably about 20 N/m. The magnetic members 38 are active on a portion of the first annular body 15, when the first annular body is in the free wheel configuration, having an axial extension of at least 25%, preferably at least 35%, even more preferably at least 50%, even more preferably at least 65%, even more preferably at least 80%, even more preferably 100%, of the total axial dimension of the first annular body 15.

In the preferred embodiment of the invention, the magnetic members 38 are active on a portion of the path in the axial direction followed by the first annular body 15 in the passage from the free wheel configuration to the motion transmission configuration. Such a portion of the path in the axial direction has an extension of at least 25%, preferably at least 35%, even more preferably at least 50%, even more preferably at least 65%, even more preferably at least 80%, even more preferably 100%, of the entire path in the axial direction followed by the first annular body 15.

In a first embodiment of the invention (better illustrated in FIGS. 2 to 4), the magnetic members 38 comprise a magnetized body 39 fixedly connected to the hub pin 13. The magnetized body 39 can be an insert fitted onto the hub pin 13 or it can be integral with the hub pin 13. In any case, the magnetized body is an annular body that extends circumferentially around the hub pin 13. The magnetized body 39 comprises a first portion 40 that extends substantially parallel to the hub pin 13 and a second portion 41 substantially perpendicular to the first portion 40 that extends from an axially outer end of the first portion 40 (FIG. 2).

The magnetic members 38 further comprise at least one portion 15a, 15b of the first annular body 15 made of ferromagnetic material.

Figure 2:
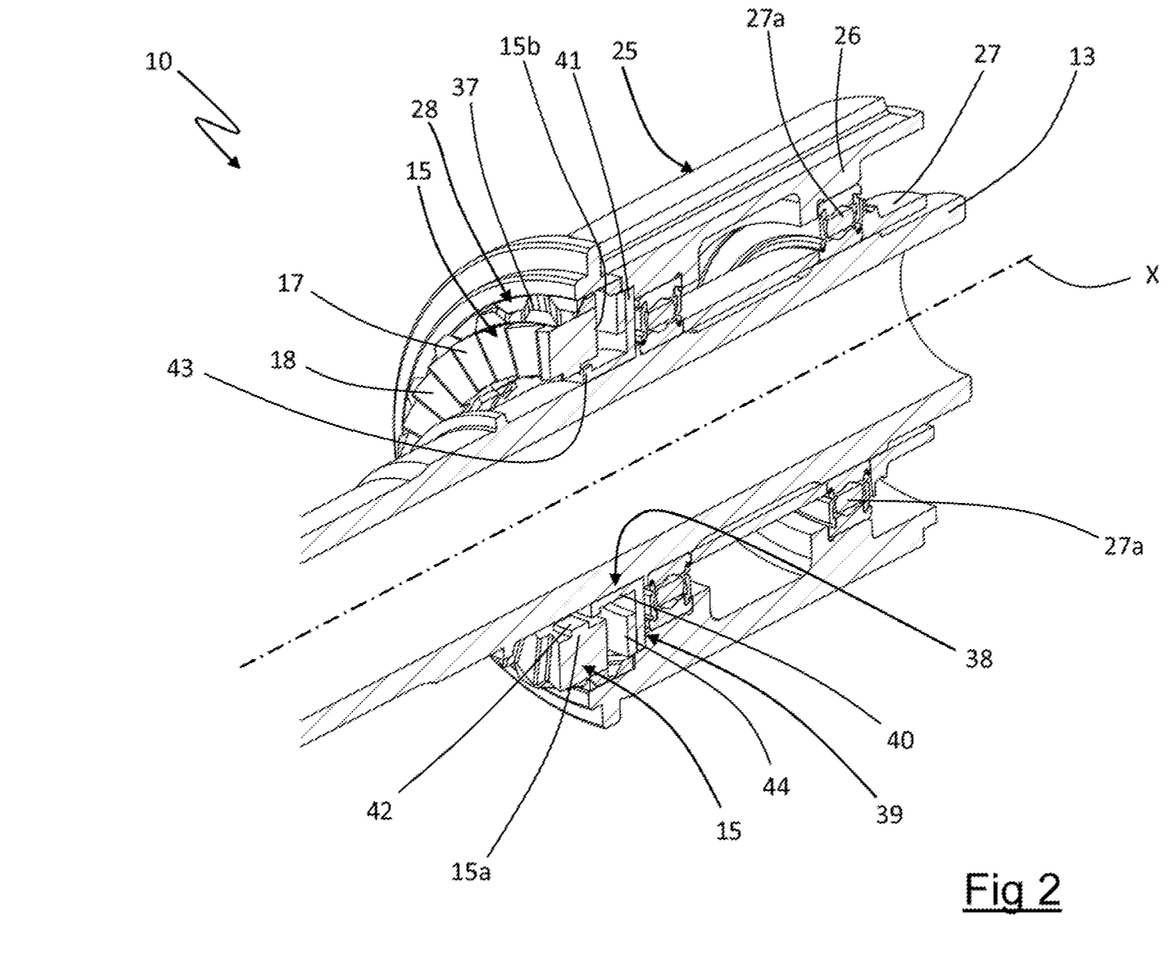
FIG. 2 is a perspective section view of a second portion of the free wheel assembly in accordance with the present invention in a first embodiment.

In particular, the first annular body 15 comprises a radially inner portion 15a radially facing the first portion 40 of the magnetized body 39 and an axially outer portion 15b axially facing the second portion 41 of the magnetized body, as represented in FIG. 2.

In this embodiment, the radially inner portion 15a and/or the axially outer portion 15b of the first annular body 15 make the quoted at least one portion of the first annular body 15 made of ferromagnetic material. Preferably, the first annular body 15 is made substantially entirely of ferromagnetic material, so that a magnetic circuit crosses the magnetized body 39 and the first annular body 15.

In particular, the first annular body 15 is made at least partially of steel alloys, or of iron-nickel-aluminum alloys or of iron-silicon alloys or of iron-nickel alloys or a combination thereof.

Figure 4:
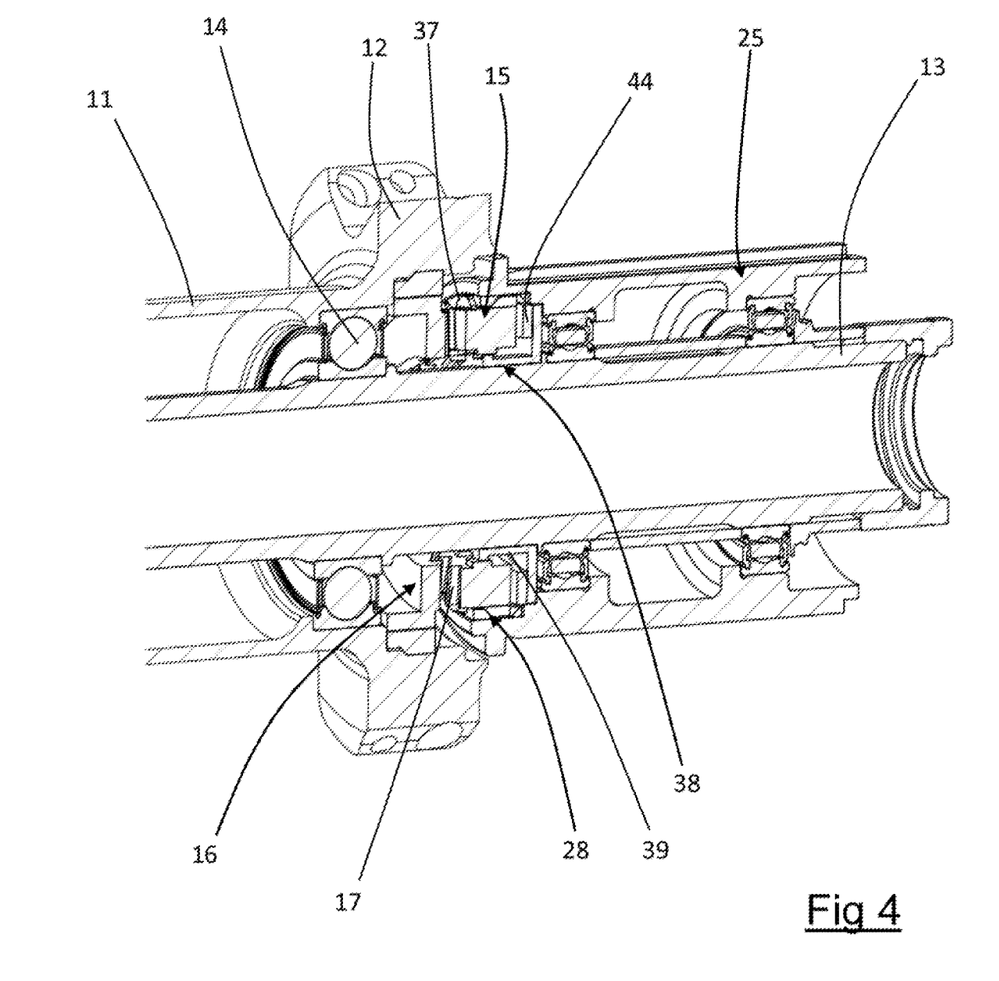
FIG. 4 is a perspective section view of the free wheel assembly in accordance with the present invention in the first embodiment.

The radially inner portion 15a of the first annular body 15 comprises a plurality of projections 42 radially directed towards the first portion 40 of the magnetized body 39 circumferentially separate from one another (FIG. 4).

The first portion 40 of the magnetized body 39 comprises a plurality of projections 43 radially directed towards the first annular body 15 circumferentially spaced apart from one another.

The height in the radial direction of the plurality of projections 42, 43 of the first annular body 15 and of the magnetized body 39 is such as to avoid mechanical interference between the first annular body 15 and the magnetized body 39, allowing the first annular body 15 to rotate with respect to the magnetized body 39.

The projections 42 of the plurality of projections 42 of the first annular body 15 have identical extension in the radial and circumferential direction and are circumferentially separated from one another by identical distances.

The projections 43 of the plurality of projections 43 of the magnetized body 39 have identical extension in the radial and circumferential direction and are circumferentially separated from one another by identical distances.

The circumferential extension and the circumferential distance of the projections 42 of the annular body 15 are identical to the circumferential extension and to the circumferential distance of the projections 43 of the magnetized body 39.

The pluralities of projections 42, 43 of the first annular body 15 and of the magnetized body 39 define a plurality of gaps in the magnetic circuit.

As a function of the angular position taken up by the first annular body 15 with respect to the magnetized body 39, and thus as a function of the angular position taken up by the plurality of projections 42 of the first annular body 15 with respect to the projections 43 of the magnetized body 39, gaps of different sizes are made.

In particular, when the projections 42 of the first annular body 15 are radially aligned with the projections 43 of the magnetized body 39, the gaps in the magnetic circuit are of minimum size, whereas when the projections 42 of the first annular body 15 are radially misaligned with the projections 43 of the magnetized body 39 the gaps in the magnetic circuit are of maximum size.

The projections 42 of the first annular body 15 extend in the axial direction on a portion of the first annular body 15 of at least 25%, preferably at least 35%, even more preferably at least 50%, even more preferably at least 65%, even more preferably at least 80%, even more preferably 100%, of the total axial size of the first annular body 15.

The projections 43 of the magnetized body 39 extend in the axial direction on a portion of the path in the axial direction followed by the first annular body 15 in the passage from the free wheel configuration to the motion transmission configuration. Such a portion of the path in the axial direction has an extension of at least 25%, preferably at least 35%, even more preferably at least 50%, even more preferably at least 65%, even more preferably at least 80%, even more preferably 100%, of the entire path in the axial direction followed by the first annular body 15.

The rotation of the first annular body 15 with respect to the magnetized body 39 determines a sort of "cogging effect" in the magnetic circuit that passes through the magnetized body 39 and the first annular body 15 that tends to keep the projections 42 of the first annular body 15 radially aligned with the projections 43 of the magnetized body 39, with the result of braking the rotation of the first annular body 15.

The magnetized body 39 is made of ferromagnetic material and is subjected to the magnetizing action of a permanent magnet 44 preferably in direct contact with the magnetized body 39.

In the preferred embodiment of the invention, the permanent magnet 44 is arranged in an axially outer position with respect to the first annular body 15 and has polarity directed axially, namely the magnetic poles of the magnet are aligned in the axial direction.

In this way, the permanent magnet 44, as well as magnetizing the magnetized body 39, axially attracts in an axially outer direction the first annular body 15, making a holding magnet for the first annular body 15.

In a second embodiment of the invention (better illustrated in FIGS. 5 to 8), the magnetic members 38 comprise first magnets 45 fixedly connected to the hub pin 13. The first magnets 45 are circumferentially spaced apart from one another (as illustrated in FIG. 7) along the entire circumferential extension of the hub pin 13.

The first magnets 45 are polarized in the radial direction, namely they have magnetic poles aligned in the radial direction, with polarities that alternate.

In other words, two circumferentially adjacent first magnets 45 have opposite polarities so that a first magnet 45 has a magnetic field oriented in the radially inner direction (entering into the hub pin 13) and a further circumferentially adjacent first magnet 45 has a magnetic field oriented in a radially outer direction (exiting from the hub pin 13).

The first magnets 45 have identical dimensions to one another.

The first magnets 45 extend in the axial direction over a portion of the path in the axial direction followed by the first annular body 15 in the passage from the free wheel configuration to the motion transmission configuration. Such a portion of the path in the axial direction has an extension of at least 25%, preferably of at least 35%, even more preferably of at least 50%, even more preferably of at least 65%, even more preferably of at least 80%, even more preferably of 100%, of the entire path in the axial direction followed by the first annular body 15.

The circumferential distance between two circumferentially consecutive first magnets 45 is comprised between about 0.1 and 4 times, preferably between 0.2 and 3 times, more preferably between 0.3 and 2.5 times, more preferably between 0.5 and 1.5 times, more preferably about 1 times, the circumferential extension of a first magnet 45.

In this embodiment, the magnetic members 38 further comprise a second magnet 46 rotating as a unit with the first annular body 15 and magnetically interacting with the first magnets 45 (better illustrated in FIG. 7).

The second magnet 46 is arranged on a radially inner portion 15*a* of the first annular body 15 and preferably radially faces the first magnets 45.

The second magnet 46 extends axially over a portion of the first annular body 15 of at least 25%, preferably at least 35%, even more preferably at least 50%, even more preferably about 65%, of the total axial size of the first annular body 15.

Preferably, a plurality of second magnets 46 is provided equally circumferentially spaced apart from one another. The circumferential position of the second magnets 46 on the first annular body 15 is such that when a second magnet is radially aligned with a first magnet 45, the other second magnets 46 are also radially aligned with a respective first magnet 45. In particular, when a second magnet 46 is radially aligned with a first magnet 45, all of the second magnets are radially aligned with respective first magnets 45 having the same polarity, namely all having polarity radially entering or all having polarity radially exiting the hub pin 13.

The polarity of the second magnets 46 is directed radially like for the first magnets 45. The first magnets 45 and the second magnets 46 can be made of neodymium.

When the first annular body 15 rotates with respect to the hub pin 13, a second magnet 46 enters into the magnetic field of a first magnet 45 and is attracted by it. A further rotation of the first annular body 15 is thus obstructed by the magnetic interaction between the first 45 and the second magnet 46. When the first annular body 15 rotates further overcoming the attraction force between the first 45 and the second magnet 46, the second magnet 46 enters into the magnetic field of an adjacent first magnet 45 and is repelled by it in the direction of a further circumferentially adjacent first magnet 45 that has a magnetic field that once again attracts the second magnet 46.

Also in this embodiment a permanent magnet 47 is provided arranged in an axially outer position with respect to the first annular body 15 and has polarity directed axially, namely the magnetic poles of the magnet 47 are aligned in the axial direction.

In this way, the permanent magnet makes a holding magnet 47 for the first annular body 15.

In use, the free wheel assembly 10 with front clutches operates as described hereinafter.

Figure 6:
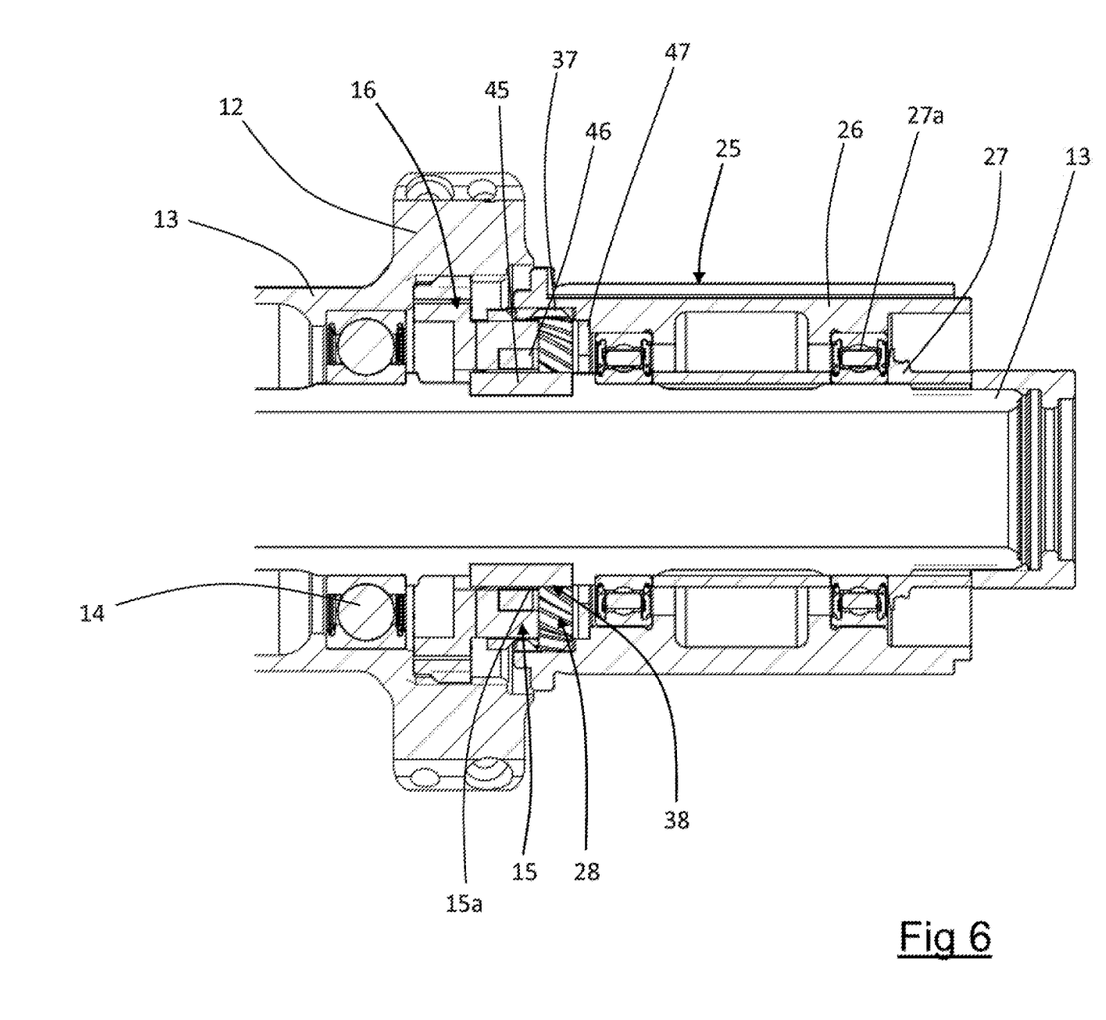
FIG. 6 is a section view of the free wheel assembly of FIG. 5 in a different operating configuration.
Figure 7:
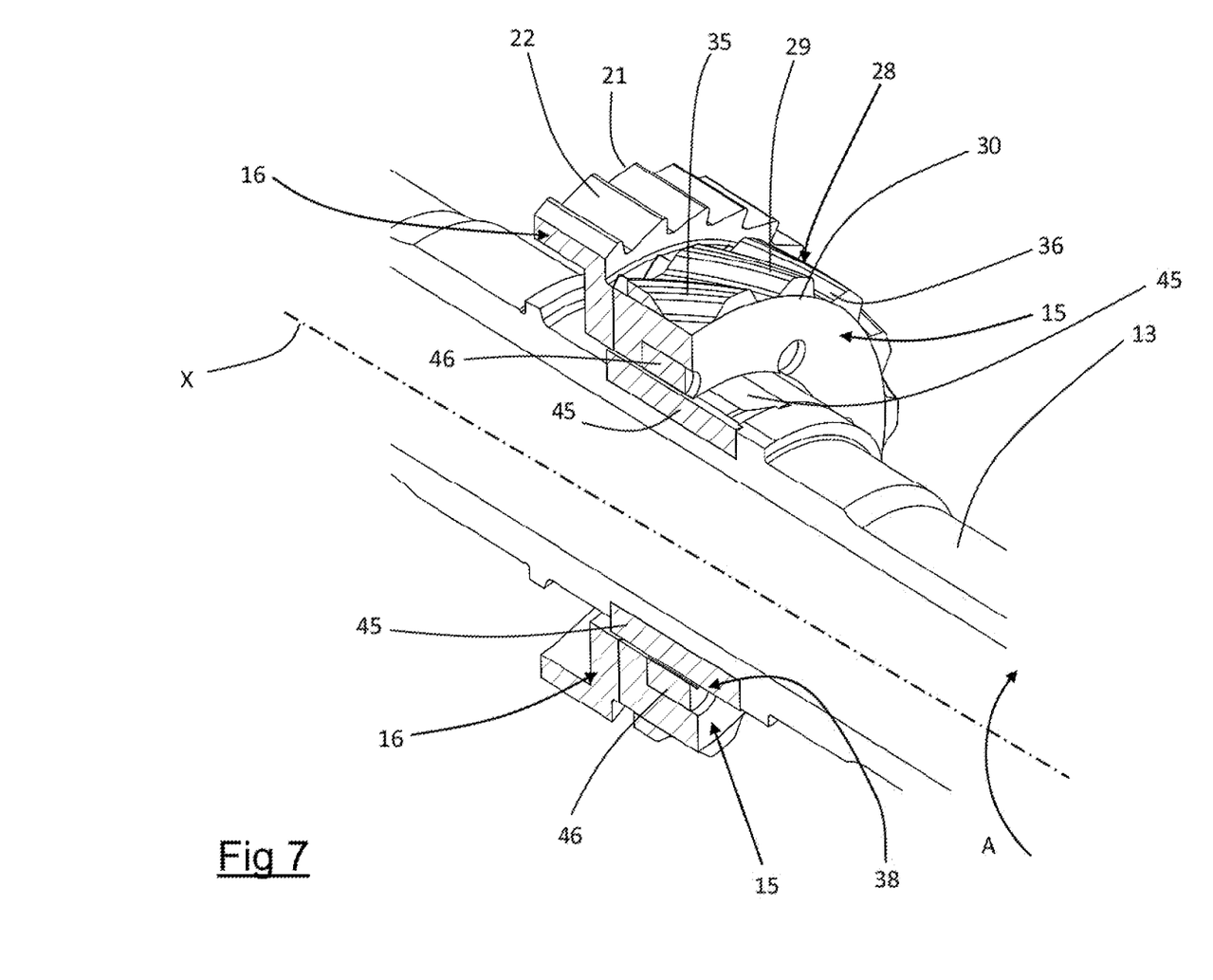
FIG. 7 is a perspective section view of a portion of the free wheel assembly of FIG. 6.

During propulsive pedaling by the cyclist, the first annular body 15 is in the motion transmission configuration and is rotatably coupled with the second annular body 16, as illustrated in FIG. 6.

In this condition, the first crown gear 17 of the first annular body 15 is engaged with the second crown gear 23 of the second annular body 16 and the first annular body 15 transmits a rotary motion along the first angular direction A to the second annular body 16.

In this configuration, the first annular body 15 rotates as a unit with the cassette 25 (in the first angular direction A) since the first annular body 15 cannot translate in the axially inner direction due to the constraint offered by the second annular body 16.

It should be noted that during a rotation in the first angular direction A of the cassette, the guides 37 allow the first annular body 15 to perform a possible axial translation only in the axially inner direction.

When the cyclist stops or slows down his/her propulsive action, the second annular body 16 (fixedly connected to the rear wheel) has an angular speed in the first angular direction A greater than the angular speed in the same angular direction of the first annular body 15.

In this situation, the teeth 18, 24 of the first 17 and of the second crown gear 23 slide over one another. Such sliding tends to axially move the first annular body 15 away from the second annular body 16 and to take the first annular body 15 into an outer axial position.

The movement of the first annular body 15 is accompanied (and allowed) by the coupling members 28. The guides 37 defined by the latter apply a movement to the first annular body 15 along a helical trajectory that axially translates the first annular body 15 outwards and rotates it by a few degrees along the second angular direction B with respect to the cassette 25.

The axial movement of the first annular body 15 is interrupted when the first 17 and the second crown gear 23 no longer interfere with one another.

Figure 5:
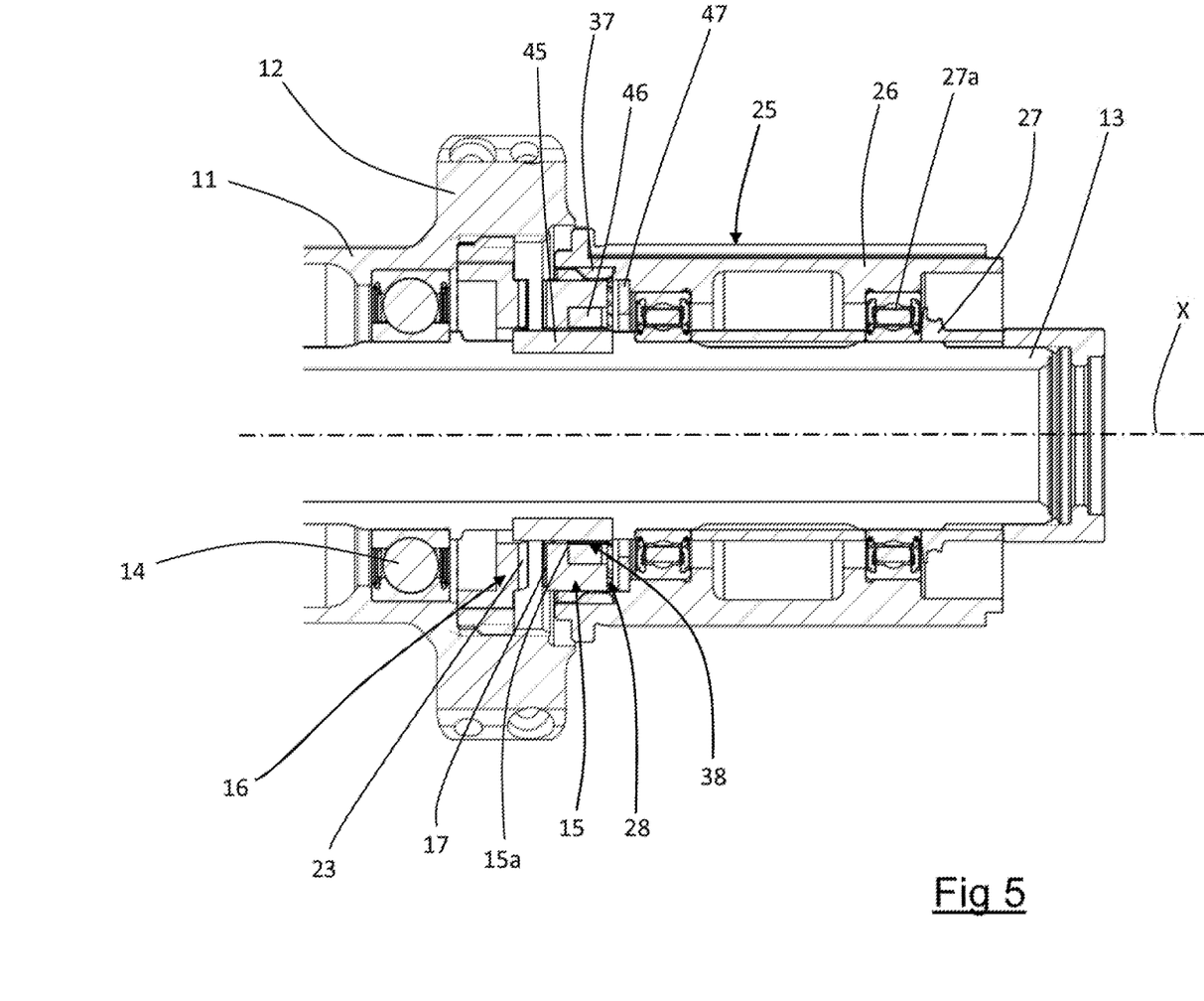
FIG. 5 is a section view of the free wheel assembly in accordance with the present invention in a second embodiment.

In this position, the first annular body 15 reaches the free wheel configuration, illustrated in FIGS. 4 and 5.

In this condition, the second annular body 16 rotates independently from the first annular body 15 without there being mechanical interference (and thus dissipation of energy) between them.

The first annular body 15 stays in the free wheel configuration also by means of the holding magnet 44, 47.

When the cyclist starts to apply the propulsive action again by setting in rotation the cassette in the first angular direction A at the same angular speed as the rear wheel, the cassette 25 tends to pull in rotation the first annular body 15.

The magnetic members 38, whether they are configured as described in relation to the first embodiment or to the second embodiment, oppose the rotation of the first annular body 15 with respect to the hub pin 13, tending to brake the first annular body 15 with respect to the cassette 25.

The constraint between the cassette 25 and the first annular body 15 made by the coupling members 28, and in particular by the guides 37, forces the first annular body 15 to translate in the axially inner direction following the rotation of the cassette 25 in the first angular direction A with respect to the annular body 15.

The first annular body 15 thus leaves the free wheel configuration to reach the motion transmission configuration again.

Of course, one skilled in the art can bring numerous modifications and variants to the invention described above, in order to satisfy specific and contingent requirements, all of which are in any case encompassed by the scope of protection of the present invention as defined by the following claims.

What is claimed is:

1. A free wheel assembly with front clutches for a bicycle, the free wheel assembly comprising:
    a hub sleeve rotatably mounted on a hub pin about a rotation axis (X) and a cassette rotatably mounted on the hub pin;
    a first annular body, rotatable about the rotation axis (X) along a first angular direction (A) and a second angular direction (B), rotatably inserted on the hub pin, and comprising a first crown gear;
    a second annular body coupled in rotation with said hub sleeve and comprising a second crown gear matching and axially facing said first crown gear;
    said first annular body being axially movable with respect to the second annular body between a motion transmission configuration, in which the first crown gear is coupled with the second crown gear, and a free wheel configuration, in which the first crown gear is separated from the second crown gear and the first annular body does not transfer motion to the second annular body;
    coupling members operating between the first annular body and the cassette;
    wherein, when the first annular body is in the free wheel configuration, a rotation of the cassette with respect to the first annular body forces said coupling members to axially translate the first annular body towards the second annular body,
    and wherein magnetic members are configured to oppose the rotation of the first annular body with respect to the hub pin.

2. The free wheel assembly according to claim 1, wherein said magnetic members are active between the hub pin and the first annular body.

3. The free wheel assembly according to claim 1, wherein the magnetic members are configured to exert a resistant torque, which opposes the rotation of the first annular body with respect to the hub pin, said resistant torque being smaller than a predetermined drive torque adapted for rotating the first annular body with respect to the hub pin.

4. The free wheel assembly according to claim 1, wherein said first annular body has a predetermined axial dimension; said magnetic members being active on a portion of the first annular body having an axial extension of at least 25% of said predetermined axial dimension when the first annular body is in the free wheel configuration.

5. The free wheel assembly according to claim 1, wherein said coupling members comprise a plurality of guides extending in a spiral or helix operating between the first annular body and the cassette;
    wherein an extension in an axial direction of said spiral shaped guides is greater than or equal to an axial distance between the first crown gear and the second crown gear when the first annular body is in the free wheel configuration.

6. The free wheel assembly according to claim 1, further comprising a holding magnet axially operative on the first annular body to hold the first annular body in the free wheel configuration.

7. The free wheel assembly according to claim 1, wherein said magnetic members comprise at least one portion made of ferromagnetic material of said first annular body and at least one permanent magnet.

8. The free wheel assembly according to claim 7, wherein the portion made of ferromagnetic material of the first annular body is made at least partially of steel alloys, iron-nickel-aluminum alloys, iron-silicon alloys, iron-nickel alloys, or a combination thereof.

9. The free wheel assembly according to claim 7, further comprising a holding magnet axially operative on the first annular body to hold the first annular body in the free wheel configuration, wherein said holding magnet coincides with said permanent magnet of the magnetic members.

10. The free wheel assembly according to claim 1, wherein said magnetic members comprise a magnetized body fixedly connected to the hub pin, radially facing a radially inner portion of the first annular body and axially facing an axially outer portion of the first annular body so realizing a magnetic circuit that passes through said first annular body.

11. The free wheel assembly according to claim 10, wherein said magnetized body comprises a plurality of projections radially directed towards the first annular body and wherein the first annular body comprises a plurality of projections radially directed towards the magnetized body; a radial distance between said projections of the first annular body and of the magnetized body defining gaps in said magnetic circuit.

12. The free wheel assembly according to claim 11, wherein the projections of the plurality of projections of the first annular body have an identical radial and circumferential extension and are circumferentially separated from one another by identical distances and wherein the projections of the plurality of projections of the magnetized body have an identical radial and circumferential extension and are circumferentially separated from one another by identical distances.

13. The free wheel assembly according to claim 1, wherein said magnetic members comprise first magnets fixedly connected to the hub pin and at least one second magnet rotating as a unit with the first annular body and magnetically interacting with said first magnets.

14. The free wheel assembly according to claim 13, wherein the first magnets and said at least one second magnet have a radially directed polarization.

15. The free wheel assembly according to claim 14, wherein the first magnets follow one another and are spaced apart from one another in a circumferential direction; the polarities of two circumferentially adjacent first magnets being opposite.

* * * * *